(12) United States Patent
Fiedler et al.

(10) Patent No.: US 8,024,086 B2
(45) Date of Patent: Sep. 20, 2011

(54) DETERMINING A RELATIVE MOVEMENT OF A CHASSIS AND A BODY OF A WHEELED VEHICLE

(75) Inventors: Jens Fiedler, Thalmassing (DE);
Andreas Mayer, Regensburg (DE);
Thomas Schweiger, Wörth (DE);
Martin Stratesteffen, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 468 days.

(21) Appl. No.: 10/596,368

(22) PCT Filed: Oct. 29, 2004

(86) PCT No.: PCT/EP2004/052716
§ 371 (c)(1),
(2), (4) Date: Jun. 9, 2006

(87) PCT Pub. No.: WO2005/056315
PCT Pub. Date: Jun. 23, 2005

(65) Prior Publication Data
US 2007/0067112 A1    Mar. 22, 2007

(30) Foreign Application Priority Data
Dec. 12, 2003 (DE) .................................. 103 58 334

(51) Int. Cl.
*B60G 17/018* (2006.01)
(52) U.S. Cl. ......... 701/37; 701/38; 701/110; 280/5.507; 280/5.514; 280/5.506; 280/5.51; 280/5.515
(58) Field of Classification Search .................. 701/37, 701/38, 110; 280/55, 5.507, 5.506, 5.514, 280/5.515
See application file for complete search history.

(56) References Cited

U.S. PATENT DOCUMENTS

| | | | |
|---|---|---|---|
| 5,011,180 A * | 4/1991 | Dunwoody | 280/5.507 |
| 5,124,938 A * | 6/1992 | Algrain | 702/141 |
| 5,475,593 A * | 12/1995 | Townend | 701/38 |
| 5,563,789 A * | 10/1996 | Otterbein et al. | 701/38 |
| 5,670,872 A * | 9/1997 | Van De Walle et al. | 324/171 |

(Continued)

FOREIGN PATENT DOCUMENTS
DE        42 28 893 A1     3/1994
(Continued)

OTHER PUBLICATIONS

International Search Report and the Written Opinion of the International Searching Authority, or the Declaration for Application No. PCT/EP2004/052716, 5 pages, Jan. 21, 2005.

*Primary Examiner* — Mark Hellner
*Assistant Examiner* — Redhwan Mawari
(74) *Attorney, Agent, or Firm* — King & Spalding L.L.P.

(57) ABSTRACT

For determination of a relative movement of a chassis and a body of a wheeled vehicle, which is movably joined to the chassis, three linear accelerations of the wheeled vehicle, which extend perpendicular to each other, respectively, as well as at least two rotational speeds of one respective rotational movement or a component of a rotational movement about a coordinate axis of the wheeled vehicle are measured (in measuring device 1), the at least two coordinate axes running perpendicular to each other, respectively. A momentary position of the relative movement is determined (in evaluation unit 9) using the three linear accelerations and the at least two rotational rates.

16 Claims, 3 Drawing Sheets

U.S. PATENT DOCUMENTS

| | | | |
|---|---|---|---|
| 5,864,768 A * | 1/1999 | Bieber et al. | 701/38 |
| 6,000,702 A * | 12/1999 | Streiter | 280/5.507 |
| 6,085,133 A * | 7/2000 | Keuper et al. | 701/37 |
| 6,292,759 B1 * | 9/2001 | Schiffmann | 702/151 |
| 6,298,292 B1 * | 10/2001 | Shono et al. | 701/37 |
| 6,298,293 B1 | 10/2001 | Ohsaku et al. | 701/37 |
| 6,502,023 B1 * | 12/2002 | Fukada | 701/38 |
| 6,647,352 B1 | 11/2003 | Horton et al. | 702/151 |
| 2003/0125857 A1 | 7/2003 | Madau et al. | 701/37 |
| 2004/0178587 A1 * | 9/2004 | Hiebert et al. | 280/5.507 |
| 2007/0067112 A1 * | 3/2007 | Fiedler et al. | 702/33 |

FOREIGN PATENT DOCUMENTS

| | | |
|---|---|---|
| DE | 102 28 813 A1 | 7/2003 |
| EP | 1 002 709 A2 | 10/1999 |
| EP | 1002709 A2 * | 5/2000 |

* cited by examiner

DETERMINING A RELATIVE MOVEMENT OF A CHASSIS AND A BODY OF A WHEELED VEHICLE

CROSS-REFERENCE TO RELATED APPLICATIONS

This application is a U.S. national stage application of International Application No. PCT/EP2004/052716 filed Oct. 29, 2004, which designates the United States of America, and claims priority to German application number DE 103 58 334.3 filed Dec. 12, 2003, the contents of which are hereby incorporated by reference in their entirety.

TECHNICAL FIELD

The invention relates to an arrangement and a method for determining a relative movement of a chassis and a vehicle body of a wheeled vehicle, wherein said vehicle body is movably connected to the chassis.

Suspension travel of a spring-loaded connection between a vehicle body and a chassis, or height levels of the relative movement between the chassis and the vehicle body, for example, are used as input variables of systems for adjusting an absorption of the relative movement and/or other systems for adjusting and/or monitoring properties of the vehicle.

In particular, the invention relates to a combination of the arrangement with at least one of the aforementioned systems or with any combination of such systems.

BACKGROUND

In order to determine the suspension travel or height levels the prior art discloses measuring, in the vicinity of the wheels, a length of a dimension between the chassis and the vehicle body or the change in a position of a measuring point. For example, four-wheeled vehicles always have one such measuring sensor per wheel or three such measuring sensors, these being designated as height-level sensors in the following.

However, height-level sensors are relatively expensive and subject to significant stresses during their deployment in a motor vehicle. This is due in particular to adverse mechanical effects e.g. from particles and stones which are swirled up into the region between wheels and vehicle body during travel, and from humidity and temperature fluctuations.

SUMMARY

The present invention addresses the problem of specifying an arrangement and a method which allow a reliable and economical determination of a relative movement of a chassis and a vehicle body of a wheeled vehicle, said vehicle body being movably connected to the chassis.

In order to determine a relative movement of a chassis and a vehicle body of a wheeled vehicle, said vehicle body being movably connected to the chassis, it is proposed
  within the wheeled vehicle to measure three respectively perpendicular linear accelerations of the wheeled vehicle and at least two rotational speeds, each relating to a rotational movement or a component of a rotational movement about a coordinate axis of the wheeled vehicle, wherein the at least two coordinate axes run perpendicularly to each other, and
  to determine a momentary movement position of the relative movement using the three linear accelerations and the at least two rotational speeds (in particular repeated).

The following is additionally proposed: An arrangement for determining a relative movement of a chassis and a vehicle body of a wheeled vehicle, said vehicle body being movably connected to the chassis, which arrangement has
  a measuring entity which is arranged or can be arranged in the wheeled vehicle, wherein the measuring entity is configured to measure three respectively perpendicular linear accelerations of the wheeled vehicle and at least two rotational speeds, each relating to a rotational movement or a component of a rotational movement about a coordinate axis of the wheeled vehicle, wherein the at least two coordinate axes run perpendicularly to each other, and
  an analysis entity which is combined with the measuring entity and is configured to determine a momentary movement position of the relative movement using the three linear accelerations and the at least two rotational speeds.

The measuring entity preferably has acceleration sensors for measuring the three linear accelerations and rotational speed sensors for measuring the at least two rotational speeds, wherein the acceleration sensors and the rotational speed sensors can be parts of a preprepared hardware unit which is configured for installation in the wheeled vehicle. This unit is a special embodiment of a so-called Inertial Measurement Unit (IMU). The IMU is intended for attachment at or in the vicinity of the center of gravity of a wheeled vehicle, for example. Therefore the center of gravity of the wheeled vehicle or of a body of a wheeled vehicle preferably lies within the unit.

Moreover, it is preferable if the three linear accelerations can be measured by the measuring entity as measured variables which are linearly independent of each other. The directions of the accelerations or acceleration components which are in each case captured by the acceleration sensors preferably form the axes of a three-dimensional right-angled system of coordinates.

A corresponding preference applies to the orientation of the at least two coordinate axes, in relation to which components of the rotational vector of a rotational movement of the vehicle are measured. In other words, the measuring entity is configured such that the at least two axes run perpendicularly to each other as a pair in each case.

The measuring entity can include a separate sensor for each measured variable, for example. However, there are also sensors which simultaneously measure two of the cited measured variables (e.g. two accelerations or two rotational speeds).

In particular, the measuring sensors of the measuring entity for measuring the rotational speeds and for measuring the linear accelerations are attached to the vehicle body which can move relative to a vehicle chassis. In this way, the solution according to the invention allows at least some of the sensors and preferably all sensors to be arranged at a location which is protected from environmental influences. The region of the center of gravity of the wheeled vehicle or the region of the center of gravity of a vehicle body is suitable for this purpose in many cases.

Depending on the orientation of the vehicle, acceleration sensors measure a measured variable which is influenced by the force of gravity. When the vehicle is stationary, the acceleration sensor measures only the effects of the force of gravity. The real acceleration does not then appear in the variable as measured.

In this description, the dynamic acceleration variable which is changed by the force of gravity is designated as the effective acceleration variable. The effective acceleration values are preferably used when determining the relative movement of the chassis and the vehicle body. Therefore the gravity or gravitational force which actually also influences the relative movement of the chassis and the vehicle body is taken into consideration. Correction of the effective acceleration values, which could be achieved e.g. by integrating the measured rotational speeds and determining the orientation of the vehicle relative to an earth-fixed system of coordinates, is not necessary. Rather, the gravitational force affects the vehicle in different ways depending on the travel situation (e.g. during travel on roadways having different inclines) and should also be taken into consideration.

As a result of using the at least two rotational speeds and the three accelerations of the vehicle, it is also possible to establish the relative movement between the vehicle body and the chassis without height-level sensors. This also applies when cornering and/or when traveling on inclined roadways or inclined subsurfaces (inclined laterally and/or forwards).

It is possible to economize at least part of the cost-intensive height-level sensors. On the other hand, the sensors for measuring the linear accelerations and rotational speeds can also be used for other purposes (e.g. as input variables for further electronic systems such as an anti-blocking system or the electronic stability program). Moreover, it is possible to monitor existing height-level sensors with regard to reliably determining the suspension travel and/or the height positions. If the height-level sensors temporarily supply implausible measured values, it can be decided—perhaps using further measured variables (e.g. travel speed, angle of lock)—whether systems which use the height levels as input variables can still be operated. For example, it might be decided that the height levels (or equivalent variables) which are determined in the manner according to the invention can still be used, since the height-level sensors were disrupted by environmental influences.

In particular, a plurality of momentary movement positions are calculated using the at least two rotational speeds and the three linear accelerations, wherein each of the movement positions is a measure for a distance between the vehicle body and at least one wheel of the chassis.

The momentary movement position is preferably calculated with reference to a spring suspension, in particular a spring suspension which is moderated, between at least one of the wheels of the wheeled vehicle and a vehicle body.

In particular, the analysis entity can include a calculation unit which is configured to calculate the relative movement. The calculation unit includes e.g. a microprocessor.

BRIEF DESCRIPTION OF THE DRAWINGS

The invention is now explained in greater detail with reference to exemplary embodiments. In this case, reference is made to the appended schematic drawing and a preferred embodiment is described. Identical reference signs in the drawing designate units or entities which are identical, functionally identical or equivalent. In the individual figures in the drawing.

DETAILED DESCRIPTION

Figure 1:
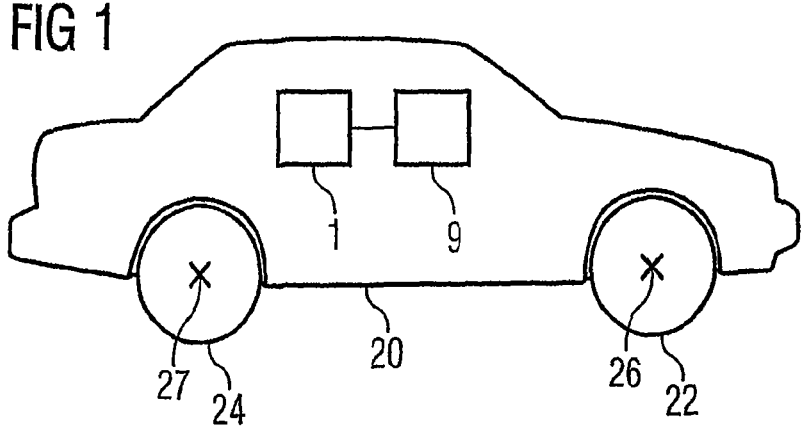
FIG. 1 shows a road motor vehicle including an arrangement for determining a relative movement between a chassis and a vehicle body.

The road motor vehicle 20 illustrated in FIG. 1 has two front wheels and two rear wheels, of which the right-hand front wheel is designated using the reference sign 22 and the right-hand rear wheel is designated using the reference sign 24. The front wheels are assigned to a front axle 26. The rear wheels are assigned to a rear axle 27. The wheels which are assigned to an axle rotate coaxially when the road motor vehicle 20 is traveling in a straight line, i.e. they have a shared axis of rotation. A measuring entity 1 which is connected to an analysis entity 9 is arranged in the road motor vehicle 20.

Figure 7:
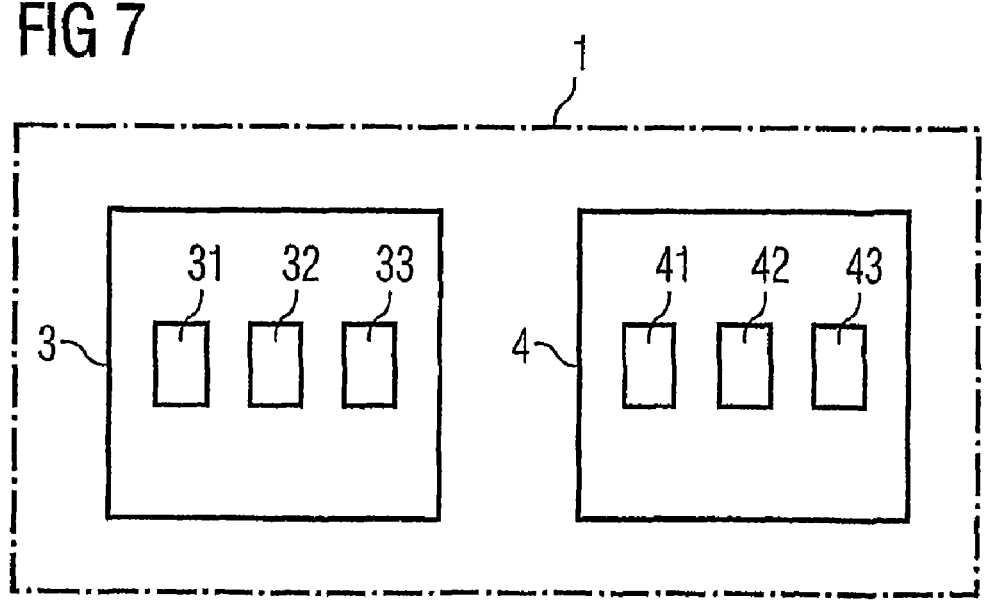
FIG. 7 shows an example for a configuration of the measuring entity which is illustrated in FIG. 1.

As illustrated in FIG. 7, the measuring entity 1 includes e.g. an acceleration measuring entity 3 and a rotational speed measuring entity 4. The measuring entity 1 is in particular a ready-made structural unit, wherein the corresponding measuring sensors for measuring the accelerations and rotational speeds are arranged in fixed positions relative to each other in the unit. The structural unit is preferably defined for attachment at or in the vicinity of the center of gravity of a motor vehicle, wherein a specific alignment within the vehicle is intended.

Figure 6:
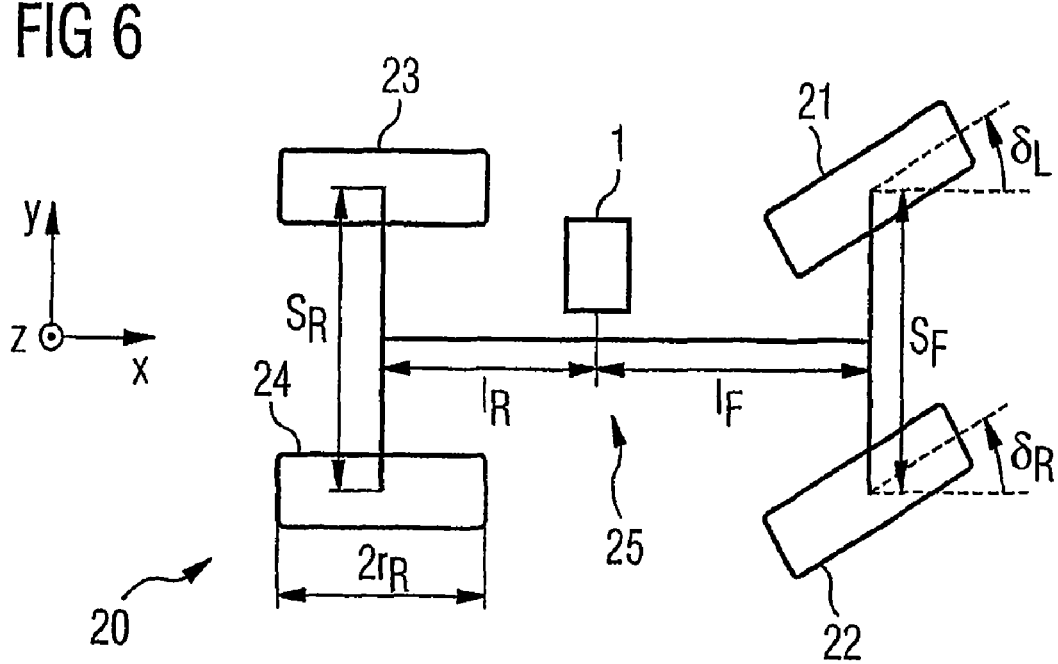
FIG. 6 shows an illustration of a road motor vehicle for clarifying dimensions and angles.

In particular, the acceleration measuring entity 3 has three linear acceleration sensors 31, 32, 33 (FIG. 7) which are arranged such that one of the acceleration sensors in each case measures an acceleration or acceleration component of the vehicle in the direction of the axes of a Cartesian system of coordinates, wherein the x-axis points forwards in the longitudinal direction of the vehicle, the y-axis is oriented perpendicularly to the longitudinal axis, and the z-axis (in the case of a vehicle which is oriented horizontally) extends vertically upwards. Such a system of coordinates is illustrated schematically in FIG. 6. This figure shows a road motor vehicle 20 including two steerable front wheels 21, 22 and two non-steerable rear wheels 23, 24. In the state which is illustrated, the front wheels are steered to the left and exhibit an angle of lock of $\delta_L$ (left-hand front wheel 21) or $\delta_R$ (right-hand front wheel 22) in relation to the x-axis. The front wheels 21, 22 have a distance between each other (wheelbase) of $S_F$, the rear wheels 23, 24 have a distance between each other of $S_R$. $r_R$ designates the radius of the rear wheels 23, 24. The measuring entity 1 is arranged approximately in the center of a vehicle body 25 in a longitudinal direction. In a longitudinal direction, it has a distance $l_F$ from the axle of the front wheels 21, 22 and a distance $l_R$ from the axle of the rear wheels 23, 24.

The invention is not limited to wheeled vehicles having front-wheel steering. On the contrary, the rear wheels can also be steerable.

Figure 2:
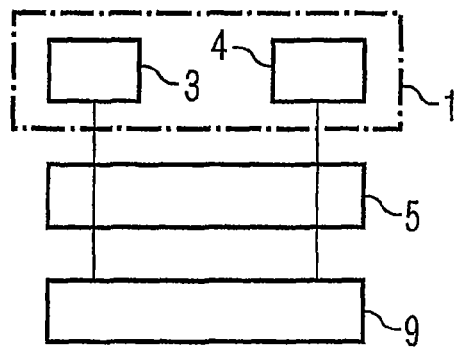
FIG. 2 shows a configuration of the analysis entity which is illustrated in FIG. 1, in combination with a measuring entity.

An exemplary embodiment for the arrangement shown in FIG. 1 is illustrated in FIG. 2. The acceleration measuring entity 3 is connected to the analysis entity 9 via a filter entity 5. The rotational speed measuring entity 4 is likewise connected to the analysis entity 9 via the filter entity 5.

Figure 3:
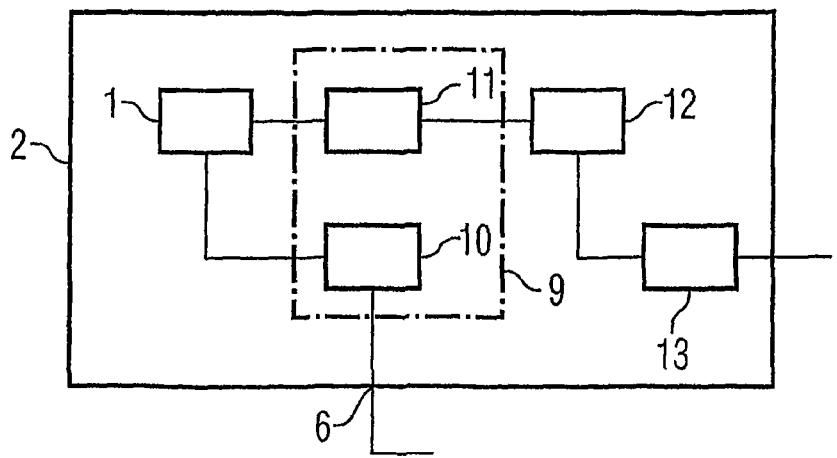
FIG. 3 shows the measuring entity which is illustrated in FIG. 1, in a shared housing with the analysis entity.

The filter entity 5 illustrated in FIG. 2 represents further filter entities which can be provided additionally in the case of the arrangements illustrated in FIG. 1 to FIG. 3 or in the case of modified arrangements. The filtering by the filter entities of measurement signals and/or signals derived therefrom is utilized in particular for eliminating any noises which might be present and for eliminating high-frequency fluctuations of the measurement signals, e.g. caused by vibrations of the vehicle body. In particular, the filter entities can include at least one low-pass filter and/or at least one band-pass filter.

The filter entity 5 filters the acceleration signals which are measured by the acceleration measuring sensors of the acceleration measuring entity 3 and the rotational speed signals which are measured by the rotational speed measuring sensors of the rotational speed measuring entity 4, before these are transferred to the analysis entity 9.

As shown in FIG. 3, the measuring entity 1 and the analysis entity 9 can be arranged together with further units and/or entities in a shared housing 2.

As illustrated in the figure, the analysis entity 9 can have a calculating unit 11 and a monitoring entity 10. The calculating unit 11 is used for calculating the relative movements of vehicle body and chassis. The monitoring entity 10 is used for monitoring the measurement signals which are generated by the measuring entity 1.

Using measurement signals of an angle of lock and a vehicle speed, which measurement signals are received via an input 6, the monitoring entity 10 carries out a monitoring of at least one of the variables measured by the measuring entity 1. For example, the monitoring entity 10 uses at least two angles (the angle of roll and the angle of pitch of the vehicle, which are obtained by integrating the rotational speeds) for monitoring the linear accelerations, said angles being a measure for the orientation of the vehicle in an earth-fixed system of coordinates. In this way, it can take into consideration that the measured linear accelerations, depending on the orientation of the vehicle relative to the earth-fixed system of coordinates, contain a component which can be traced back to the gravity.

As illustrated additionally in FIG. 3, the calculating unit 11 can be connected e.g. to a moderation regulating entity 12 in order to set a moderation of a spring suspension between the chassis and the vehicle body. Relevant information relating to such a travel situation can be output via an interface 13, to which e.g. the moderation regulating entity 12 is connected (and which alternatively can be connected directly to the calculating unit 11), to a system which utilizes the height levels and/or the linear accelerations measured by the measuring entity and/or rotational speeds as input variables.

The following now deals with an example for the calculation of the relative movement, said calculation being carried out e.g. by the calculating unit 11. A physical vehicle model is used in this case.

In this model, the vehicle body is considered to be a rigid body, i.e. no elasticities of the vehicle body are permitted. Allowance is nonetheless made for a spring suspension (in particular modulated) between the wheels and the vehicle body. Furthermore, three degrees of freedom of the relative movement between the chassis and the vehicle body are permitted, specifically a linear movement in the z-direction (e.g. the movement of a point, within the vehicle body, at which the measuring entity measures), a first rotational movement about a first axis of rotation (in particular the x-axis) which runs horizontally through the vehicle, and a second rotational movement about a second axis of rotation (in particular the y-axis) which runs horizontally through the vehicle and perpendicularly to the first axis of rotation.

Figure 4:
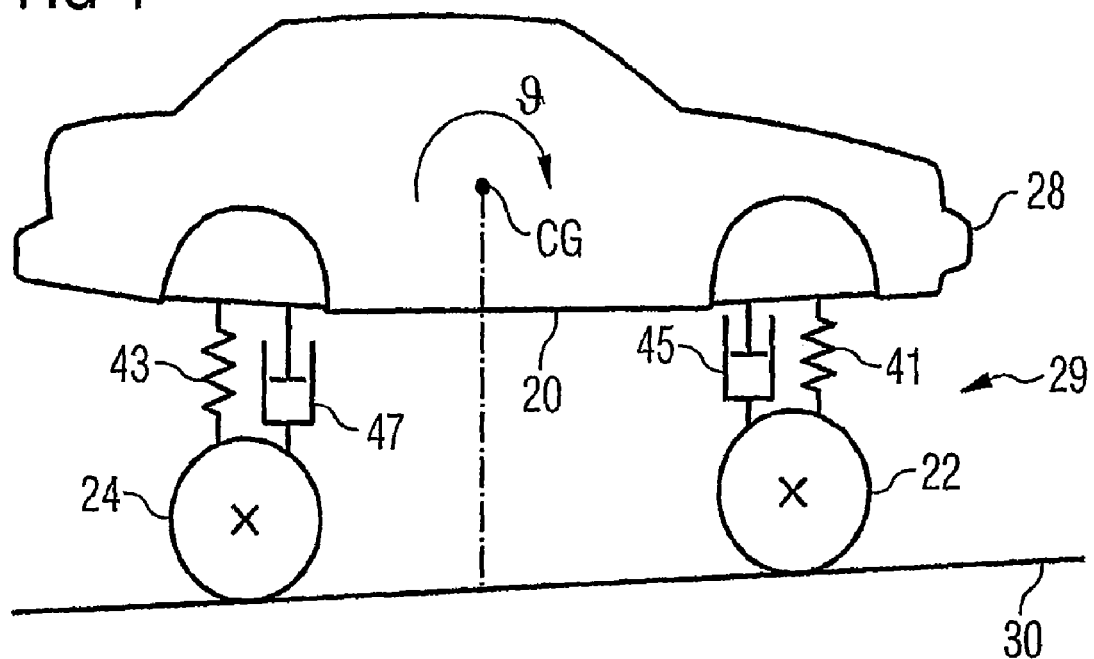
FIG. 4 shows a side view of a model of a road motor vehicle including a chassis and a vehicle body which is connected to the chassis via a moderated spring suspension.
Figure 5:
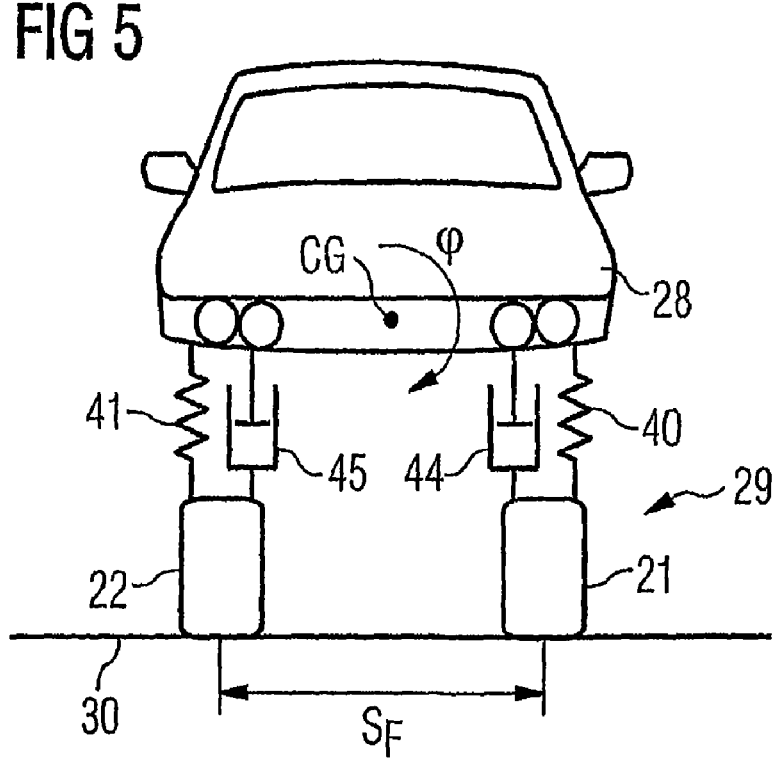
FIG. 5 shows the model as per FIG. 4 from the front.

FIG. 4 and FIG. 5 illustrate the model schematically. A vehicle body 28 has center of gravity CG and is connected individually to the four wheels 21, 22, 23, 24 via springs 40, 41, 43 (only three of the four wheels are shown in the two figures) and via moderating elements 44, 45, 47 which act in parallel with the springs 40, 41, 43. Since the wheels 21, 22, 23, 24 are not directly mechanically connected to each other, it is also possible to speak of a five-mass model. The wheels 21, 22, 23, 24 stand on the subsurface 30 (e.g. a roadway). However, it has been shown that a two-mass model is equivalent to the five-mass model under certain conditions, wherein the wheels and further parts of the chassis form one mass and the vehicle body forms the other mass. Instead of the individual springs between the wheels and the vehicle body, consideration is given in each case to a single cumulative spring and (optionally) in each case an associated moderation for each of the three cited degrees of freedom. It is nonetheless possible to calculate the suspension travel or height levels at the four wheels individually using the two-mass model.

The following differential equations are solved in the context of the model:

$$\kappa_R \Delta\phi + \gamma_R \Delta\dot\phi = c_R a_y^{(e)} - \dot\omega_x$$

$$\kappa_P \Delta\theta + \gamma_P \Delta\dot\theta = -c_P a_x^{(e)} - \dot\omega_y$$

$$k\Delta z + \Gamma \Delta\dot z = -a_z^{(e)}$$

In this case, $\kappa_R$, $\kappa_P$, k are vehicle parameters which correspond to a linear spring force of the relevant movement component of the degree of freedom, $\gamma_R$, $\gamma_P$, $\Gamma$ are vehicle parameters which correspond to a linear moderation term of the relevant movement component, $c_R$, $c_P$ are further vehicle parameters, $\Delta\phi$ is the relative angle of rotation between vehicle body and chassis about the x-axis (angle of roll), $\Delta\theta$ is the relative angle of rotation between vehicle-body and chassis about the y-axis (angle of pitch), and $a_j^{(e)}$, j=x,y,z are the effective linear accelerations in direction x, y, z as measured by the measuring entity which is arranged at the center of gravity of the vehicle body.

All parameters can be determined in advance e.g. experimentally and/or mathematically for a specific vehicle or a specific vehicle type.

The differential equations can therefore be solved (in particular numerically) and the movements in the three degrees of freedom $\Delta\phi$, $\Delta\theta$ and $\Delta z$ can be determined repeatedly (e.g. with a frequency of more than 100 Hz).

Application of the suspension travel equations $$\Delta h_{FL} = \Delta z - l_F \Delta\vartheta + \frac{1}{2} s_F \Delta\varphi$$

$$\Delta h_{FR} = \Delta z - l_F \Delta\vartheta - \frac{1}{2} s_F \Delta\varphi$$

$$\Delta h_{RL} = \Delta z + l_R \Delta\vartheta + \frac{1}{2} s_R \Delta\varphi$$

$$\Delta h_{RR} = \Delta z + l_R \Delta\vartheta - \frac{1}{2} s_R \Delta\varphi$$

produces the suspension travels $\Delta h_j$, j=FL,FR,RL,RR (the first index F signifies "front", the first index R signifies "rear", the second index L signifies "left" and the second index R signifies "right"), wherein $S_F$ is the wheelbase of the front wheels, $S_H$ is the wheelbase of the rear wheels, and $l_F$; $l_R$ are the distances in an x-direction from the measuring entity to the front axle or the rear axle respectively, which distances have already been introduced with reference to FIG. 6.

As mentioned above, this model presupposes the vehicle body to be a rigid body in itself, and is therefore suitable in good approximation for the travel of motor vehicles on roads. The model takes movements of roll and pitch into consideration as described above, and is therefore particularly suitable for travel situations and/or vehicles in which such movements occur. This applies particularly to vehicles having a center of gravity which is positioned high above the chassis, e.g. in the case of trucks and rough-terrain vehicles.

In the above set of three differential equations, the following changes or alternatives can be implemented in particular:
- the springs can be described as non-linear springs,
- in one or more of the equations, in particular in the equation for the angle of pitch $\Delta\theta$, it is possible additionally to take into consideration a distribution of a braking force or braking forces and/or a driving force or driving forces (e.g. in the case of all-wheel driven vehicles) across the wheels, and/or
- the equation can be at least partially linked.

What is claimed is:

1. An arrangement for determining a vertical movement of a vehicle chassis relative to a vehicle body of a wheeled vehicle, said vehicle body being movably connected to the chassis, comprising
    a measuring entity arranged in the wheeled vehicle, wherein the measuring entity is configured to measure three respectively perpendicular linear accelerations of the wheeled vehicle and at least two rotational speeds, each relating to a rotational movement or a component of a rotational movement about a coordinate axis of the wheeled vehicle, wherein the at least two coordinate axes run perpendicularly to each other, and
    an analysis entity which is combined with the measuring entity and is operable to determine a momentary vertical distance between the vehicle body relative to the vehicle chassis using the three linear accelerations and the at least two rotational speeds, and without using any height-level or suspension travel measurements as input for determining the momentary vertical distance,
    wherein the analysis entity comprises a calculating unit which is operable to calculate a plurality of the momentary vertical distances using the at least two rotational speeds and the three linear accelerations.

2. An arrangement according to claim 1, wherein the measuring entity has acceleration sensors for measuring the linear accelerations and rotational speed sensors for measuring the rotational speeds, and wherein the acceleration sensors and the rotational speed sensors are parts of a preprepared hardware unit which is configured for installation in the wheeled vehicle.

3. An arrangement according to claim 1, wherein the measuring entity is configured such that the three linear accelerations are measurable as measured variables which are linearly independent of each other.

4. An arrangement according to claim 1, wherein the measuring entity is configured such that the at least two coordinate axes run perpendicularly to each other as a pair in each case.

5. An arrangement according to claim 1, wherein the analysis entity includes a calculating unit which is configured to calculate the momentary vertical distance between the vehicle body relative to the vehicle body with reference to a spring suspension, in particular a spring suspension which is moderated, between at least one of the wheels of the wheeled vehicle and the vehicle body.

6. A method for determining a vertical movement of a vehicle chassis relative to a vehicle body of a wheeled vehicle, said vehicle body being movably connected to the chassis, the method comprising the steps of:
    measuring three respectively perpendicular linear accelerations of the wheeled vehicle and at least two rotational speeds, each relating to a rotational movement or a component of a rotational movement about a coordinate axis of the wheeled vehicle, wherein the at least two coordinate axes run perpendicularly to each other;
    determining a momentary vertical distance between the vehicle body relative to the vehicle chassis using the three linear accelerations and the at least two rotational speeds, and without using any height-level or suspension travel measurements as input for determining the momentary vertical distance
    calculating a plurality of the momentary vertical distances using the at least two rotational speeds and the three linear accelerations, and
    providing the momentary vertical distances as input variables of systems for at least one of adjusting and monitoring properties of the wheeled vehicle.

7. A method according to claim 6, wherein the linear accelerations are measured using acceleration sensors and the rotational speeds are measured using rotational speed sensors, and wherein the acceleration sensors and the rotational speed sensors are parts of a preprepared hardware unit which is arranged in the wheeled vehicle.

8. A method according to claim 6, wherein the three linear accelerations are measured as measured variables which are linearly independent of each other.

9. A method according to claim 6, wherein the at least two coordinate axes of the rotational speeds run perpendicularly to each other as a pair in each case.

10. A method according to claim 6, wherein the momentary vertical distance between the vehicle body relative to the vehicle body is calculated with reference to a spring suspension, in particular a spring suspension which is moderated, between at least one of the wheels of the wheeled vehicle and the vehicle body.

11. An arrangement for determining a vertical movement of a vehicle chassis relative to a body of a vehicle, said vehicle body being movably connected to the chassis, comprising:
    a measuring entity configured to measure three respectively perpendicular linear accelerations of the vehicle and at least two rotational speeds, each relating to a rotational movement or a component of a rotational movement about a coordinate axis of the vehicle, wherein the at least two coordinate axes run perpendicularly to each other, and
    an analysis entity configured to determine a momentary vertical distance between the vehicle body relative to the vehicle chassis using the three linear accelerations and the at least two rotational speeds, and without using any height-level or suspension travel measurements as input for determining the momentary vertical distance,
    wherein the analysis entity comprises a calculating unit operable to calculate a plurality of the momentary vertical distances using the at least two rotational speeds and the three linear accelerations.

12. An arrangement according to claim 11, wherein the measuring entity has acceleration sensors for measuring the linear accelerations and rotational speed sensors for measuring the rotational speeds.

13. An arrangement according to claim 12, wherein the acceleration sensors and the rotational speed sensors are parts of a preprepared hardware unit which is configured for installation in the wheeled vehicle.

14. An arrangement according to claim 11, wherein the measuring entity is configured such that the three linear accelerations are measurable as measured variables which are linearly independent of each other.

15. An arrangement according to claim 11, wherein the measuring entity is configured such that the at least two coordinate axes run perpendicularly to each other as a pair in each case.

16. An arrangement according to claim 11, wherein the analysis entity includes a calculating unit which is configured to calculate the momentary vertical distance between the vehicle body relative to the vehicle body with reference to a spring suspension, in particular a spring suspension which is moderated, between at least one of the wheels of the vehicle and the body.

* * * * *